United States Patent
Engstrand

(10) Patent No.: US 7,518,100 B2
(45) Date of Patent: *Apr. 14, 2009

(54) SYSTEM AND METHOD FOR DETECTING A POSITION OF A MOVABLE ELEMENT

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/430,161

(22) Filed: May 8, 2006

(65) Prior Publication Data

US 2007/0075228 A1 Apr. 5, 2007

Related U.S. Application Data

(63) Continuation-in-part of application No. 11/242,799, filed on Oct. 3, 2005, now Pat. No. 7,294,823.

(51) Int. Cl.
*G01D 5/34* (2006.01)
*F01B 25/26* (2006.01)

(52) U.S. Cl. .......................... 250/231.1; 91/1

(58) Field of Classification Search ............. 250/231.1; 91/1; 92/5 R
See application file for complete search history.

(56) References Cited

U.S. PATENT DOCUMENTS

| | | |
|---|---|---|
| 3,368,751 A | 2/1968 | Merill |
| 3,885,872 A | 5/1975 | Howe, Jr. et al. |
| 4,150,299 A | 4/1979 | Kasiewicz et al. |
| 4,501,642 A | 2/1985 | Wells |
| 4,661,695 A | 4/1987 | Mori et al. |
| 4,736,674 A | 4/1988 | Stoll |
| 4,806,707 A | 2/1989 | Landmeier |
| 4,902,903 A | 2/1990 | Sergson et al. |
| 4,970,361 A | 11/1990 | Fuse |
| 5,182,979 A | 2/1993 | Morgan |
| 5,231,959 A | 8/1993 | Smietana |
| 5,271,505 A | 12/1993 | Low |
| 5,705,742 A | 1/1998 | Fox et al. |

(Continued)

OTHER PUBLICATIONS

U.S. Appl. No. 11/238,893, filed Sep. 9, 2005, Engstrand.
U.S. Appl. No. 11/242,799, filed Oct. 3, 2005, Engstrand.

*Primary Examiner*—Thanh X Luu
(74) *Attorney, Agent, or Firm*—Patents + TMS, P.C.

(57) ABSTRACT

A system and a method detect a position of a movable element within the interior of the compartment via a light source and/or a light sensor. The light sensor is connected to a platform and/or to a film for detecting an intensity of a light within the interior of the compartment. The film, a bottom surface of an end cap and/or a surface of the movable element and/or the compartment attenuate light within the interior of the compartment and/or within an interior of the end cap. The intensity of the light detectable by the light sensor corresponds to the position of the movable element within the interior of the compartment. The position of the movable element within the interior of the compartment is detected by the light sensor via the intensity of the light detectable by the light sensor. The film, the platform, the bottom surface of the end cap and/or the surface of the movable element and/or of the compartment minimize diffraction of the light within the interior of the compartment and/or within the interior of the end cap.

20 Claims, 6 Drawing Sheets

U.S. PATENT DOCUMENTS

| | | |
|---|---|---|
| 5,744,705 A | 4/1998 | Derouen et al. |
| 5,799,626 A | 9/1998 | Ponsford et al. |
| 5,977,778 A | 11/1999 | Chan et al. |
| 5,988,676 A | 11/1999 | Lotito et al. |
| 6,058,776 A | 5/2000 | Algers et al. |
| 6,170,573 B1 | 1/2001 | Brunet et al. |
| 6,952,009 B1 | 10/2005 | Engstrand |
| 7,348,542 B2 * | 3/2008 | Engstrand ............ 250/231.1 |

* cited by examiner

US 7,518,100 B2

SYSTEM AND METHOD FOR DETECTING A POSITION OF A MOVABLE ELEMENT

This application is a Continuation-In-Part Application of U.S. patent application Ser. No. 11/242,799 filed on Oct. 3, 2005, now U.S. Pat. No. 7,294,823.

BACKGROUND OF THE INVENTION

The present invention generally relates to a system and a method for detecting a position of a movable element. More specifically, the present invention relates to a system and a method for detecting a position of a movable element within a compartment via a light sensor and/or a light source. The light source may be located within an interior of an end cap which may be adjacent to an interior of the compartment. A platform may be connected to interior walls of the end cap for supporting the light sensor and/or a film. The platform and/or the film may be located between the interior of the end cap and/or the interior of the compartment for positioning the light sensor within the interior of the compartment. The light source may be connected to a bottom surface of the end cap for emitting, for transmitting and/or for projecting light within the interior of the end cap and/or of the compartment. The light source may transmit light into the interior of the compartment for determining, for detecting and/or for identifying the position of the movable element within the interior of the compartment. The film may diffuse, may scatter and/or may attenuate the light being transmitted from the light source into the interior of the compartment and/or of the end cap. In an embodiment, the light sensor may be connected to the bottom surface of the end cap for determining, for detecting and/or for identifying the position of the movable element within the interior of the compartment. The light sensor may detect, may measure and/or may determine the position of the movable element within the interior of the compartment via the intensity of light emitted within the interior of the end cap.

A surface of the compartment may absorb, may diffuse and/or may attenuate an amount of the light which may be transmitted from the light source into the interior of the compartment. The amount of the light which may be absorbed, may be diffused and/or may be scattered by the surface of the compartment may correspond to the position of the movable element within the interior of the compartment. A surface of the movable element may absorb, may diffuse and/or may attenuate an amount of the light which may be transmitted from the light source into the interior of the compartment. The light sensor may measure, may detect and/or may identify an intensity of the light within the interior of the compartment and/or of the end cap which may not have been absorbed, may have been diffused and/or may have been attenuated by the surface of the compartment and/or of the movable element. As a result, the film and/or the surface of the compartment and/or of the movable element may minimize diffraction of the light within the interior of the compartment and/or of the end cap. The bottom surface of the end cap may reflect, may diffuse and/or may attenuate light transmitted within the interior of the end cap by the light source.

It is, of course, generally known to measure and/or to detect a position of a movable element within an interior of a cylinder. The first position of the movable element in the interior of the cylinder may correspond to a first location of a machine element which may be connected to and/or may be attached to the movable element. Typically, a first sensor within the interior of the cylinder may be located at a first location within the interior of the cylinder. The first location of the first sensor may be adjacent to the first position of the movable element. The first sensor must physically contact and/or must magnetically interfere with the movable element to detect that the movable element is in the first position within the interior of the cylinder.

A second position of the movable element within the interior of the cylinder may correspond to a second position of the machine element with respect to the cylinder. A second sensor within the interior of the cylinder may be at a second located within the interior of the cylinder. The second location of the second sensor may adjacent to the second position of the movable element. The second sensor must physically contact and/or may magnetically interfere with the movable element to detect that the movable element may be in the second position within the interior of the cylinder. As a result, the first sensor and the second sensor must physically contact and/or must magnetically interfere with the movable element to detect that the movable element has moved between the first position and the second position within the interior of the cylinder.

However, physical contact between the movable element and the first sensor and/or the second sensor may cause the first sensor and/or the second sensor, respectively, to inaccurately detect the first position and/or the second position of the movable element within the interior of the cylinder. Further, physical contact between the movable element and the first sensor and/or the second sensor may damage and/or may destroy the movable element, the first sensor and/or the second sensor. As a result, the first sensor and/or the second sensor may be inoperable or may inaccurately detect the first position and/or the second position of the movable element within the interior of the cylinder.

Additionally, the movable element may be made from a material which may not exhibit magnetic properties for interfering with the first sensor and/or the second sensor. For example, the movable element may be made from glass which may prevent the first sensor and/or the second sensor from magnetically interfering with the movable element to detect that the movable element is at the first position or at the second position within the interior of the cylinder. As a result, the first sensor and/or the second sensor may be incapable of detecting that the movable element has moved between the first position and the second position within the interior of the cylinder.

A need, therefore, exists for a system and a method for detecting a position of a movable element. Additionally, a need exists for a system and a method for detecting a position of a movable element within an interior of a compartment via a light sensor and a light source which may be located within an interior of an end cap and/or within an interior of the compartment. Further, a need exists for a system and a method for detecting a position of a movable element which may provide a platform and/or a film which may be attachable to interior walls of an end cap for positioning a light sensor within an interior of a compartment. Still further, a need exists for a system and a method for detecting a position of a movable element which may provide a platform and/or a film which may be attachable to interior walls of an end cap for separating a light source and a light sensor. Moreover, a need exists for a system and a method for detecting a position of a movable element which may provide a platform and/or a film which may be attachable to interior walls of an end cap to diffuse, to scatter and/or to attenuate light transmitted by a light source into an interior of a compartment and/or of an end cap. Furthermore, a need exists for a system and a method for detecting a position of a movable element which may provide a bottom surface of an end cap for reflecting, for diffusing and/or for attenuating light emitted within an interior of the end cap.

SUMMARY OF THE INVENTION

The present invention provides a system and a method for detecting a position of a movable element. Moreover, the present invention provides a system and a method for detecting a position of a movable element within an interior of a compartment via a light sensor and/or a light source which may be located within an interior of an end cap and/or of the compartment. The light sensor may be connected to a platform and/or a film which may be attached to interior walls of the end cap for determining the position of the movable element within the interior of the compartment. The platform may prevent and/or may block light transmitted by the light source from being directed towards the light sensor. The film may diffuse, may scatter and/or may attenuate light being transmitted and/or being projected into the interior of the end cap and/or of the compartment. The film and/or the platform may reduce, may minimize and/or may prevent diffraction of the light emitted within the interior of the compartment and/or of the end cap.

A surface of a movable element within the interior of the compartment and/or the movable element may absorb, may diffuse and/or may attenuate an amount of the light transmitted by the light source within the interior of the compartment. The amount of the light may correspond to and/or may be associated with the position of the movable element within the interior of the compartment. The surface of the compartment and/or of the movable element may reduce, may minimize and/or may prevent the light from diffracting within the interior of the compartment and/or of the end cap. A bottom surface of the end cap may reflect, may diffuse and/or may attenuate the light within the interior of the end cap inwardly with respect to the interior of the compartment. The light sensor may detect the intensity of light within the interior of the compartment which may not have been absorbed by, may have been diffused and/or may have been attenuated by the surface of the compartment and/or of the movable element. A film may be connected to the interior walls of the end cap for absorbing, for diffusing and/or for attenuating light emitted within the interior of the compartment and/or of the end cap.

To this end, in an embodiment of the present invention, a system for detecting a position of a movable element wherein the movable element has a surface is provided. The system has a compartment having a body defining an interior wherein the body has an interior surface and a length defined between a first end and a second end of the compartment wherein the movable element moves within the interior of the compartment between the first end and the second end of the compartment. Further, the system has a cap having bottom surface and walls defining an interior of the cap wherein the walls are connected to the bottom surface wherein the cap is connected to the first end of the compartment wherein the interior of the compartment is adjacent to the interior of the cap. Still further, the system has a film connected to the walls of the cap wherein the film encloses the interior of the cap wherein the film diffuses light emitted into the interior of the compartment. Moreover, a sensor connected to the cap wherein the sensor is adjacent to the first end of the compartment wherein the sensor detects an intensity of the light within the interior of the compartment which is attenuated by the interior surface of the compartment or by the surface of the movable element wherein the intensity of the light within the interior of the compartment corresponds to the position of the movable element within the interior of the compartment.

In an embodiment, the film is made from glass or plastic.

In an embodiment, the system has a light source connected to the cap wherein the light source projects the light into the interior of the compartment.

In an embodiment, the system has a platform attached to the walls of the cap wherein the platform connects the sensor to the cap.

In an embodiment, the bottom surface attenuates light within the interior of the cap inwardly with respect to the interior of the compartment.

In an embodiment, the system has a microprocessor connected to the sensor wherein the microprocessor is in communication with the first sensor.

In an embodiment, the system has a coating on the interior surface of the compartment or the surface of the movable element wherein the coating attenuates the light emitted within the interior of the compartment.

In an embodiment, the sensor is attached to the bottom surface of the cap wherein the sensor detects an intensity of light within the interior of the cap.

In another embodiment of the present invention, a system for detecting a position of a movable element is provided. The system has a compartment having a body defining an interior wherein the body has an interior surface and a length defined between a first end and a second end of the compartment. Additionally, the system has a cap having a bottom surface and walls defining an interior of the cap wherein the walls are connected to the bottom surface wherein the cap is connected to the first end of the compartment. Further, the system has a light source connected to the cap wherein the light source transmits light into the interior of the cap and the interior of the compartment wherein the interior surface of the compartment attenuates the light within the interior of the compartment. Still further, the system has a film connected to the walls of the cap wherein the film separates the interior of the cap and the interior of the compartment wherein the film diffuses light transmitted into the interior of the cap and the interior of the compartment. Moreover, the system has a sensor connected to the walls of the cap wherein the sensor detects an intensity of the light within the interior of the cap or the interior of the compartment wherein the intensity of the light corresponds to the light attenuated by the interior surface of the compartment wherein the light attenuated by the interior surface of the compartment corresponds to the position of the movable element.

In an embodiment, the system has the film is made from glass or plastic.

In an embodiment, the system has a platform attached to the walls of the cap wherein the platform is located between the interior of the cap and the film.

In an embodiment, the bottom surface attenuates the light within the interior of the cap inwardly with respect to the interior of the compartment.

In an embodiment, the sensor is attached to the film wherein the sensor is located within the interior of the compartment.

In an embodiment, the system has a coating on the interior surface of the compartment wherein the coating attenuates the light within the interior of the compartment.

In another embodiment of the present invention, a method for detecting a position of a movable element is provided. The method has the step of providing a compartment having a body defining an interior wherein the body has an interior surface and a length defined between a first end and a second end. Additionally, the method has the step of positioning a movable element within the interior of the compartment wherein the movable element moves within the interior of the compartment between the first end and the second end of the compartment. Further, the method has the step of connecting a film to the first end of the compartment wherein the film encloses the interior of the compartment wherein the film diffuses light emitted from the first end of the compartment into the interior of the compartment. Moreover, the method has the step of detecting an intensity of the light within the interior of the compartment wherein the intensity of the light corresponds to an amount of the light attenuated by the interior surface of the compartment and the movable element wherein the amount of light attenuated corresponds to the position of the movable element within the interior of the compartment.

In an embodiment, the method has the step of connecting a cap to the first end of the compartment wherein the cap has an interior which is separated from the interior of the compartment via the film.

In an embodiment, the method has the step of moving the movable element from the first position to a second position with respect to the interior of the compartment.

In an embodiment, the method has the step of connecting a light source to the first end of the compartment wherein the light source emits the light into the interior of the compartment via the film.

In an embodiment, the method has the step of attaching a platform to the first end of the compartment wherein the film is located between the interior of the compartment and the platform.

In an embodiment, the method has the step of forming a surface on the movable element wherein the surface attenuates the light within the interior of the compartment.

It is, therefore, an advantage of the present invention to provide a system and a method for detecting a position of a movable element.

Another advantage of the present invention is to provide a system and a method for detecting a position of a movable element which may provide an end cap having a light source and/or a light sensor to determine the position of the movable element within an interior of a compartment.

And, another advantage of the present invention is to provide a system and a method for detecting a position of a movable element which may provide a light source and a light sensor connectible to a compartment for determining the position of the movable element within an interior of the compartment.

Yet another advantage of the present invention is to provide a system and a method for detecting a position of a movable element which may provide a platform for supporting a film and/or a light sensor within an interior of a compartment.

A further advantage of the present invention is to provide a system and a method for detecting a position of a movable element which may provide a light source connected to a bottom surface of an end cap to transmit light into an interior of the end cap and/or of a compartment.

Moreover, an advantage of the present invention is to provide a system and a method for detecting a position of a movable element which may attach a film to interior walls of an end cap for diffusing, for scattering, for absorbing and/or for attenuating light transmitted through the film.

And, another advantage of the present invention is to provide a system and a method for detecting a position of a movable element which may attach a light sensor to a bottom surface of an end cap to determine the position of the movable element via an intensity of light emitted within an interior of the compartment.

Yet another advantage of the present invention is to provide a system and a method for detecting a position of a movable element which may absorb, may diffuse, may scatter and/or may attenuate light within an interior of a compartment and/or within an interior of an end cap via a film connected to the compartment.

Another advantage of the present invention is to provide a system and a method for detecting a position of a movable element which may provide a bottom surface of an end cap for reflecting, for diffusing and/or for attenuating light within an interior of the end cap.

Yet another advantage of the present invention is to provide a system and a method for detecting a position of a movable element which may provide a film and/or a platform attachable to a compartment for reducing, for minimizing and/or for prevent diffraction of light within an interior of the compartment.

A still further advantage of the present invention is to provide a system and a method for detecting a position of a movable element which may provide a surface on a compartment or on a movable element for absorbing, for diffusing and/or for attenuating light emitted within an interior of the compartment.

Moreover, an advantage of the present invention is to provide a system and a method for detecting a position of a movable element which may provide a surface on a compartment and/or on a movable element to reduce, to minimize and/or to prevent diffraction of light emitted within an interior of the compartment.

And, another advantage of the present invention is to provide a system and a method for detecting a position of a movable element which may transmit light through a film between an interior of a compartment and an interior of an end cap.

Yet another advantage of the present invention is to provide a system and a method for detecting a position of a movable element which may provide a platform and/or a film for separating an interior of a compartment and an interior of an end cap.

Another advantage of the present invention is to provide a system and a method for detecting a position of a movable element which may provide a film made from plastic and/or glass for diffusing and/or for attenuating light emitted within an interior of a compartment and/or of an end cap.

Yet another advantage of the present invention is to provide a system and a method for detecting a position of a movable element which may determine and/or may identify the position of the movable element via an intensity of light emitted within an interior of a compartment and/or of an end cap.

A still further advantage of the present invention is to provide a system and a method for detecting a position of a movable element via an intensity of light which may be diffused and/or may be attenuated by a surface on a compartment and/or on a movable element.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a system and a method for detecting a position of a movable element. More specifically, the present invention relates to a system and a method for detecting a position of a movable element within an interior of a compartment via a light source and/or a light sensor. The light source may be located within an interior of an end cap which may be adjacent to the interior of the compartment. A platform and/or a film may be attached to interior walls of the end cap for positioning a light sensor within the interior of the compartment and for separating the interior of the end cap and the interior of the compartment. The light sensor may be located within the interior of the compartment or within the interior of the end cap for determining the position of the movable element within the interior of the compartment. The light source may transmit and/or may project light within the interior of the end cap and/or of the compartment. The film may be located between the platform and the interior of the compartment for diffusing and/or for attenuating light emitted within the interior of the compartment and/or of the end cap. A bottom surface and/or the interior walls of the end cap may reflect, may diffuse and/or attenuate light emitted within the interior of the end cap. The film, the platform and/or the interior walls and/or the bottom surface of the end cap may reduce, may minimize and/or may prevent diffraction of the light within the interior of the compartment.

The light sensor may measure an intensity of the light emitted within the interior of the compartment which may be diffused by and/or may be attenuated by the film and/or a surface of the movable element and/or of the compartment. In an embodiment, the light sensor may measure an intensity of the light emitted within the interior of the end cap which may be diffused by and/or may be attenuated by the film and/or the surface of the movable element and/or of the compartment. The intensity of the light detectable by the light sensor may correspond to the position of the movable element within the interior of the compartment. As a result, the light sensor may determine the position of the movable element within the compartment via the intensity of light detected within the interior of the end cap and/or of the compartment.

Figure 1:
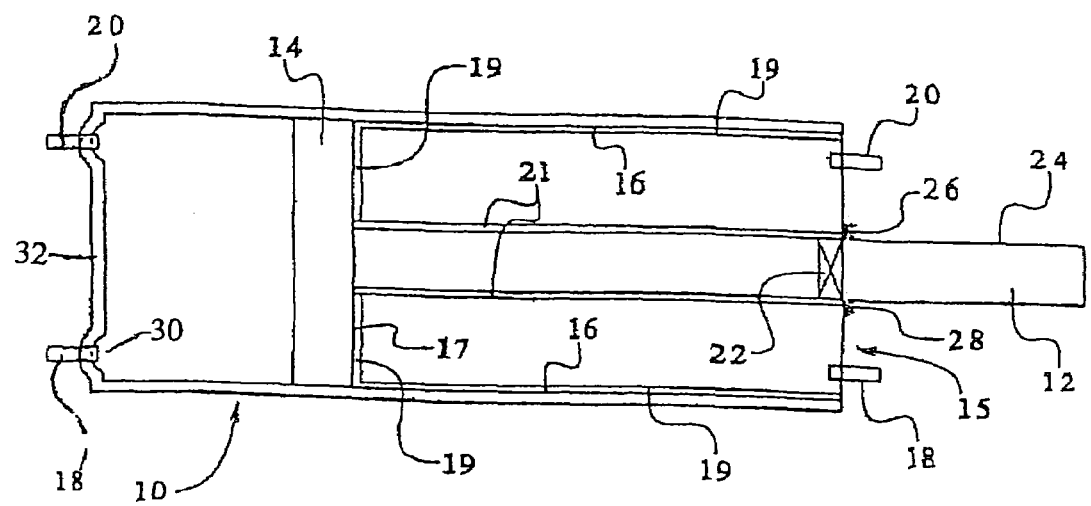
FIG. 1 illustrates a cross-sectional view of a cylinder showing sensor placement and cleaning elements of an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior wall 16. The interior wall 16 may be coated with a substance 19 that may absorb, may diffuse, may attenuate and/or may scatter a portion of the light emitted from the light source 18. The substance 19 may be an anodizing compound. The substance 19 may reduce and/or may prevent diffraction of the light emitted from the light source 18. The surface 17 of the head 14 may also be coated with the substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing, light diffusing, light attenuating and contaminant preventative properties. The substances 19, 21 may have various colors that may affect and/or control the amount of light absorption.

As the head 14 and the shaft 12 may transpose through the cylinder 10, a portion of the light emitted from the light source 18 may be absorbed by the coating 19 on the interior wall 16. A portion of the light emitted by the light source 18 may be absorbed, may be diffused may be attenuated and/or may be scattered by the coating 19, 21 on the head surface 17. Lastly, a portion of the light emitted by the light source 18 may be absorbed, may be diffused, may be attenuated and/or may be scattered by the coating 21 on the shaft surface 24. The light sensor 20 measures the intensity of light within the interior of the cylinder 10 that is not absorbed by, is diffused, is attenuated and/or is scattered by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
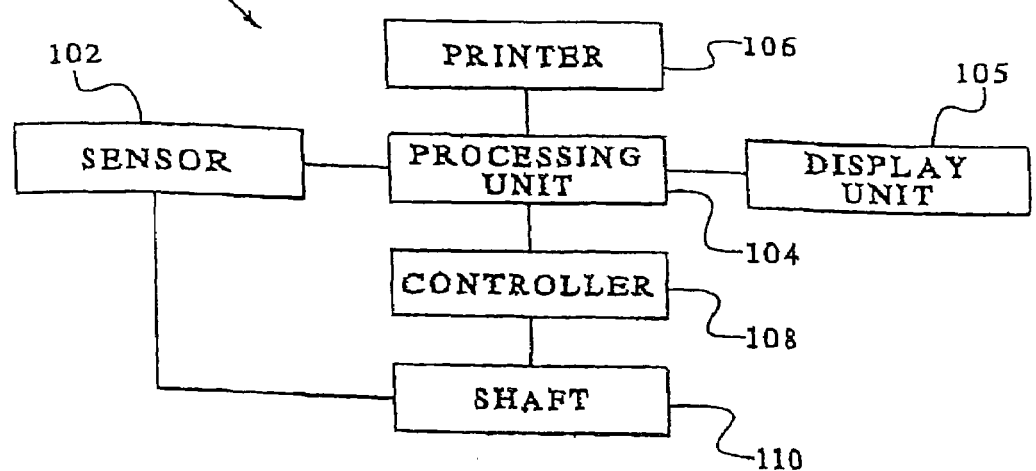
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by, that is diffused by, that is attenuated by and/or that is scattered by the coatings 19, 21 within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12. The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption, of light diffusing and/or of light attenuation and also capable of preventing and/or reducing the accumulation of contaminants onto a surface 24 of the shaft 12. The coating 19, 21 may reduce, may minimize and/or may prevent diffraction of light emitted within the cylinder 10.

Figure 3:
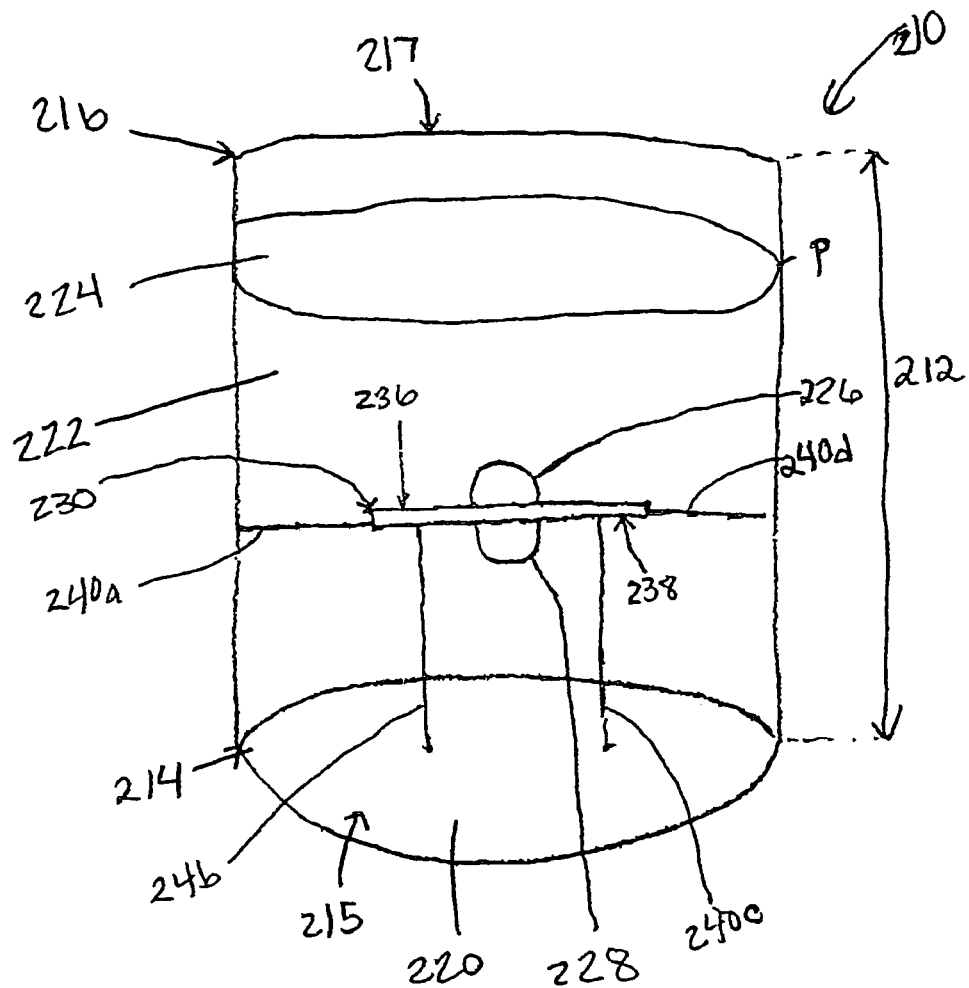
FIG. 3 illustrates a perspective view of a compartment with a movable element, a light source and a light sensor in an embodiment of the present invention.
Figure 4:
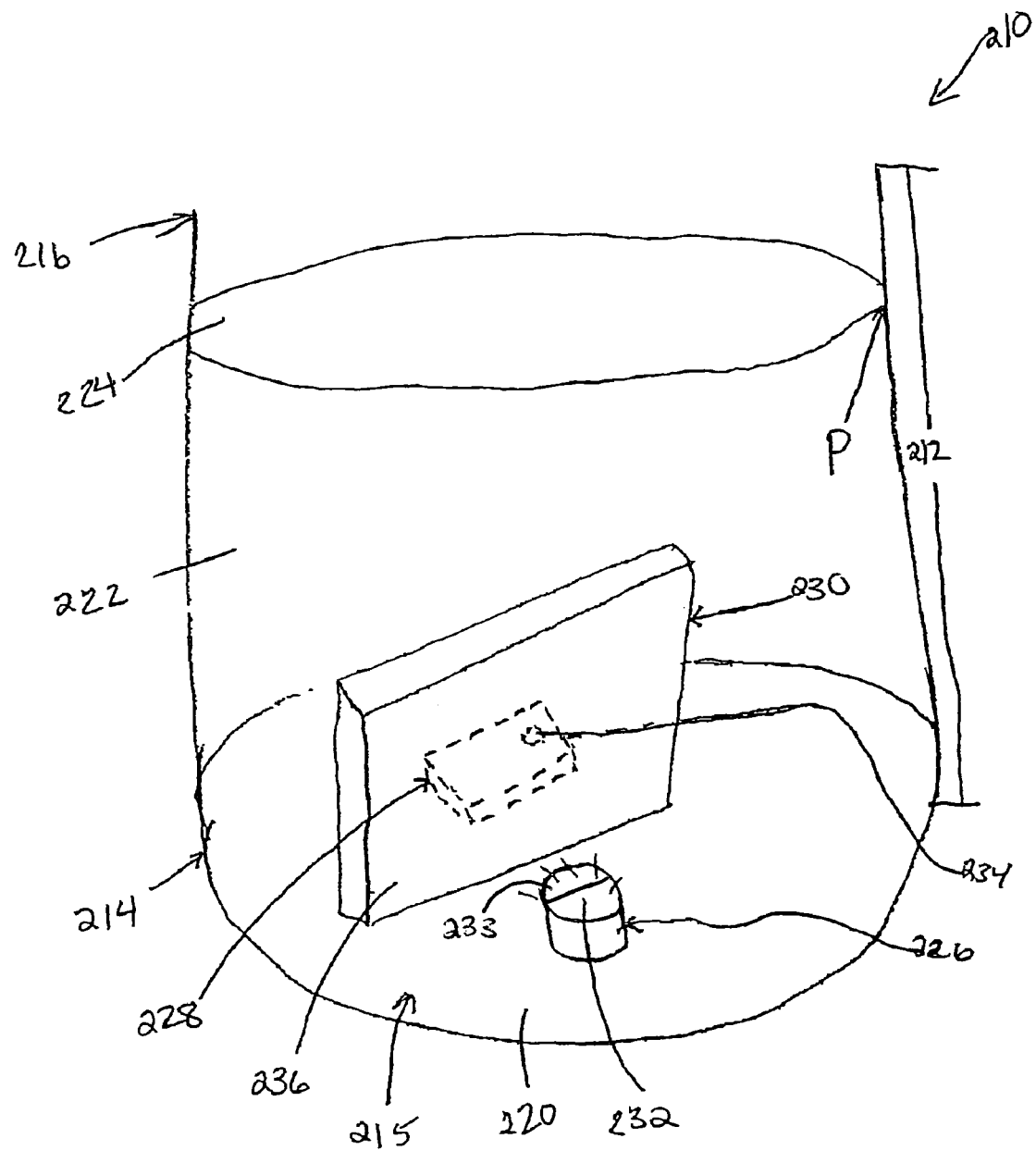
FIG. 4 illustrates a perspective view of a compartment with a movable element, a light source and a light sensor in an embodiment of the present invention.

FIGS. 3 and 4 illustrate a compartment 210 which may have a length 212 defined between a first end 214 and a second end 216. The second end 216 is opposite to the first end 214. The first end 214 and/or the second end 216 may have a first wall 215 and/or a second wall 217, respectively. The compartment 210 may have an interior surface 220 which may define an interior 222. The first wall 215 and/or the second wall 217 may be perpendicular to the interior surface 220 and/or may substantially enclose the compartment 210. The compartment 210 may be a type of cylinder, such as, for example, a hydraulic cylinder, a pneumatic cylinder and/or the like. The compartment 10 may be, for example, a hollow tube and/or the like. The present invention should not be deemed as limited to a specific embodiment of the type of the cylinder of the compartment 210.

The compartment 210 may have a movable element 224 which may be position and/or may be located in the interior 222 of the compartment 210. The movable element 224 may move in the interior 222 of the compartment 210 between the first end 214 and the second end 216. The movable element 224 may move to, may be positioned at and/or may be located at a position P in the interior 222 of the compartment 210 between the first end 214 and the second end 216. The movable element 224 may be, for example, a piston, a sphere, a tab, a flange, a spring, a magnet, a closed tube and/or the like. The present invention should not be deemed as limited to a specific embodiment of the movable element 224. It should be understood that the movable element 224 may be any movable element as known to one of ordinary skill in the art.

The interior 222 of the compartment 210 may have a light source 226, a light sensor 228 and/or a base 230. The base 230 may be located between the light source 226 and the light sensor 228. The light source 226, the light sensor 228 and/or the base 230 may be positioned on the interior surface 220 on the first end 215 of the compartment 210 and/or within the interior 222 of the compartment 210. The light source 226 may have a light emitting portion 232 directed inwardly with respect to the interior 222 of the compartment 210 as shown in FIG. 4. The light source 226 may project and/or may emit light into the interior 222 of the compartment 210. The light emitting portion 232 of the light source 226 may be, for example, an light emitting diode (hereinafter "LED"), a halogen light, a flourescent light, an incandescent light, a neon light and/or the like. The present invention may not be deemed as limited to a specific embodiment of the light source 226. It should be understood that the light source 226 may be any light source capable of projecting and/or of emitting light into the interior 222 of the compartment 210 as known to one of ordinary skill in the art.

The light sensor 228 may have a detecting portion 234 directed inwardly with respect to the interior 222 of the compartment 210 as shown in FIG. 4. The light sensor 228 may detect, may determine and/or may measure an intensity of the emitted light into the interior 222 of the compartment 210 via the detecting portion 234. Further, the light sensor 228 may detect, may determine and/or may measure a strength of the light emitted into the interior 222 of the compartment 210 via the detecting portion 234. It should be understood that the light sensor 228 may be any light sensor capable of detecting, of determining and/or of measuring the intensity of the emitted light and/or the strength of the emitted light within the interior 222 of the compartment 210 as known to one of ordinary skill in the art.

As illustrated in FIG. 3, the light source 226 may be attached to and/or may be connected to a first side 236 of the base 230. The light sensor 228 may be attached to and/or may be connected to a second side 238 of the base 230. The first side 236 is opposite to the second side 238 of the base 230. The base 230 may be attached and/or connected to the interior surface 220 of the compartment 210. Supports 240a-240d may be attached to the interior surface 220 and/or the base 230. As a result, the light source 226, the light sensor 228 and/or the base 230 may be attached to and/or may be connected to the interior surface 220 of the compartment 210. Further, the light source 226, the light sensor 228 and/or the base 230 may be located within the interior 222 of the compartment 210 via the supports 240a-240d. The supports 240a-240d may be, for example, a bar, a rod, a wire, a cable, a shaft, a pole and/or the like. The base 230 and/or the supports 240a-240b may reduce, may minimize and/or may prevent diffraction of the light within the compartment 210. The present invention may not be deemed as limited to a specific embodiment of the supports 240a-240d. It should be understood that the supports 240a-240d may have any support capable of attaching and/or connecting the base 230 to the interior surface 220 as known to one of ordinary skill in the art. As illustrated in FIG. 4, the light source 226, the light sensor 228 and/or the base 230 may be attached to the first wall 215. The base 230 may be located between the light source 226 and the light sensor 228. The light source 226 may be adjacent to first side 236 of the base 230. The light sensor 228 may be adjacent to the second side 238 of the base 230. As illustrated in FIGS. 3 and 4, the base 230 may be interposed between the light source 226 and the light sensor 228. The base 230 may prevent light emitted from the light source 226 from being directed towards the light sensor 228. As a result, the light sensor 228 may detect an intensity of light within the interior 222 of the compartment 210. Further, the base 230 may prevent the light emitting portion 232 from being directed towards the light sensor 228.

In an embodiment, a cover 233 may be applied to, may be attached to and/or may connected to the light emitting portion 232 of the light source 226 as shown in FIG. 4. The cover 233 on the light emitting portion 232 may be adjacent to the light sensor 228 within the interior 222 of the compartment 210. The cover 233 may prevent the light transmitted from the light source 226 from being directed towards the light sensor 228. In an embodiment, the cover 233 may be, for example, a paint which may be applied to the light emitting source 232 of the light source 226. In another embodiment, the cover 233 may be made from a material, such as, for example, plastic, a film and/or an acrylic. It should be understood that the cover 233 may be any cover capable of preventing the light transmitted from the light source 226 from being directed towards the light sensor 228 as known to one of ordinary skill in the art.

The compartment 210, the interior surface 220 of the compartment 210, the base 230, the supports 240a-240d and/or the movable element 224 may be made from a material which may absorb, may diffuse, may attenuate and/or may scatter an amount of the light emitted from the light source 226 and/or may have light absorbing properties. The present invention should not be deemed as limited to a specific material of the compartment 210, the interior surface 220 of the compartment 210, the base 230, the supports 240a-240d and/or the movable element 224. The material may reduce, may minimize and/or may prevent diffraction of the light within the interior 222 of the compartment 210. It should be understood that the material may be any material and/or any compound which may have light absorbing properties, light diffusing properties and/or light attenuating properties as known to one of ordinary skill in the art.

As the movable element 224 may transpose and/or may move through the compartment 210, a portion of the light emitted from the light source 226 may be absorbed by, may be diffused by and/or may be scattered by the movable element 224, the base 230, the supports 240a-240d and/or the interior surface 220 of the compartment 210 between the movable element 224 and the first end 215 of the compartment 210. The portion of the emitted light which may be absorbed by, may be diffused by and/or may be scattered by the interior surface 220, the base 230, the supports 240a-240d and/or the movable element 226 may be based on the light absorbing properties of the material of the compartment 210, the base 230, the support 240a-240d and/or the movable element 224. As a result, the interior surface 220, the base 230, the supports 240a-240d and/or the movable element 226 may attenuate the light emitted within the compartment 210.

The light sensor 228 may detect, may determine and/or may measure an intensity of the emitted light within the interior 222 of the compartment 210 which may not be absorbed by, which may be diffused by and/or may be scattered by the movable element 224, the base 230, the supports 240a-240d and/or the interior surface 220 between the movable element 224 and the first end 215 of the compartment 210. The intensity of the emitted light in the interior 222 of the compartment 210 may not include the portion of light which may be absorbed by, may be diffused by, may be attenuated by and/or may be scattered by the movable element 224, the base 230, the supports 240a-240d and/or the interior surface 220 between the movable element 224 and the first end 215 of the compartment 210.

Figure 5:
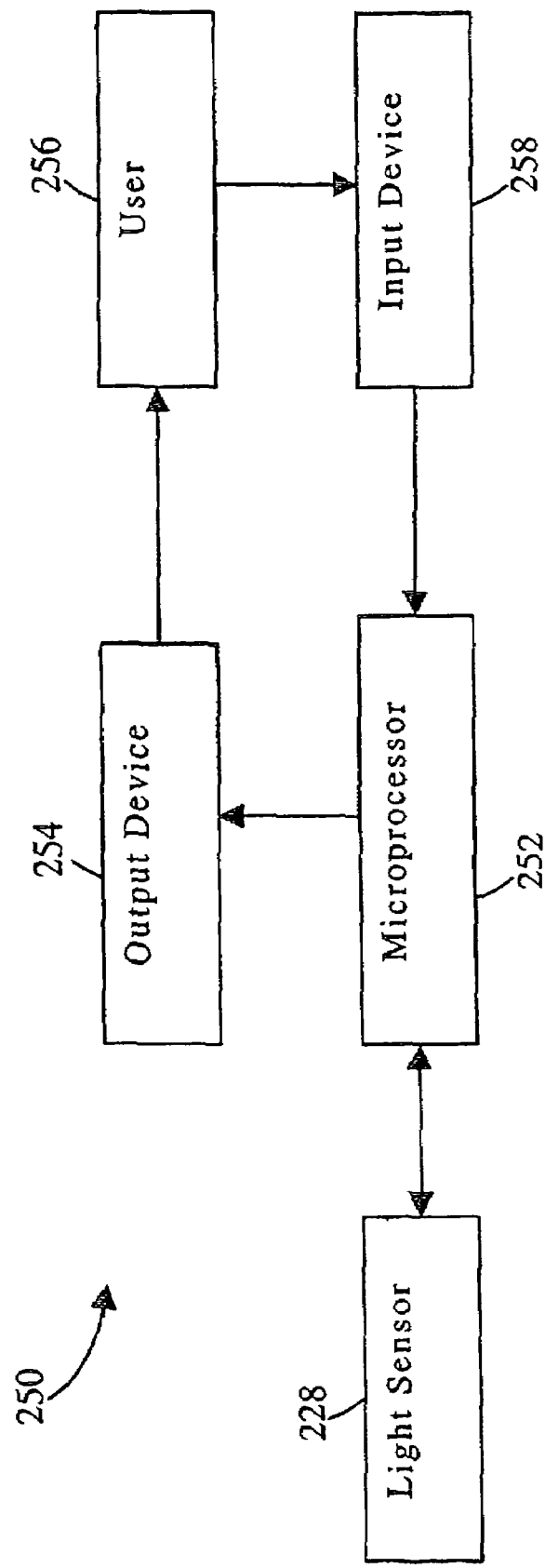
FIG. 5 illustrates a black box diagram of a system in another embodiment of the present invention.

FIG. 5 illustrates, in a black box diagram, an embodiment of a system 250 of the present invention. The light sensor 228 may be connected to and/or may be in communication with a microprocessor 252. The microprocessor 252 may be local with respect to and/or may be remote with respect to the light sensor 228. The light sensor 228 may detect and/or may measure the intensity of light within the interior 222 of the compartment 210 which may not be absorbed by, may be diffused by and/or may be attenuated by the movable element 224, the base 230, the supports 240a-240d and/or the interior surface 220 between the movable element 224 and the first end 215 of the compartment 210.

The position P of the movable element 224 in the interior 222 of the compartment 210 may correspond to, may relate to and/or may be indicative of the intensity of the emitted light detected by the light sensor 228 within the interior 222 of the compartment 210. The light sensor 228 may transmit, may send and/or may communicate position information to the microprocessor 252. The position information may relate to, may be based on, may correspond to and/or may be indicative of the intensity of the light detected by the light sensor 228 and/or the position P of the movable element 224. The microprocessor 252 may be programmed to process the position information received from the light source 228. The microprocessor 252 may be programmed to measure, to determine and/or to identify the position P of the movable element 224 in the interior 222 of the compartment 210 based on the position information received from the light sensor 228.

The microprocessor 252 may be connected to and/or may be in communication with an output device 254. The output device 254 may be local with respect to and/or may be remote with respect to the microprocessor 252 and/or the light sensor 228. The output device 254 may be a printer, a monitor, a handheld device, a speaker and/or the like. An output device 254 may display, may indicate and/or may render display information to a user 256. The display information may relate to, may correspond to and/or may be based on the position information, the intensity of light emitted and/or the position P of the movable element 224. The output device 254 may print a graph, a display, a chart and/or the like for illustrating the display information to the user 256. It should be understood that the output device 254 may be any output device capable of communicating the display information to the user 256 known to one of ordinary skill in the art.

The display information may be, for example, logarithmic, linear and/or the like. Further, the display information may be in one or more formats, such as, for example, voltages, currents, pulses, numbers and/or the like. The microprocessor 252 may be programmed to convert, to format and/or to transform the display information between one or more formats. The present invention should not be deemed as limited to a specific embodiment of the one or more formats of the display information. It should be understood that the format of the display information may be any format known to one of ordinary skill in the art.

An input device 258 may be connected to and/or in communication with the microprocessor 252. The input device 258 may be utilized by the user 256 to operate, to control and/or to instruct the microprocessor 252. The input device 258 may be a keyboard, a handheld device, a wireless portable device, a dial, a switch and/or the like. The input device 258 may be remote with respect to the microprocessor 252 and/or the output device 254. The microprocessor 252 may be programmed to receive instructions from the user 256 via the input device 258. The user 256 may select and/or may control the output device 254, the display information and/or the one or more formats of the display information via the input device 258. The present invention should not be deemed as limited to a specific embodiment of the input device 258. It should be understood that the input device 258 may be any input device capable of communicating instructions to the microprocessor 252.

Figure 6:
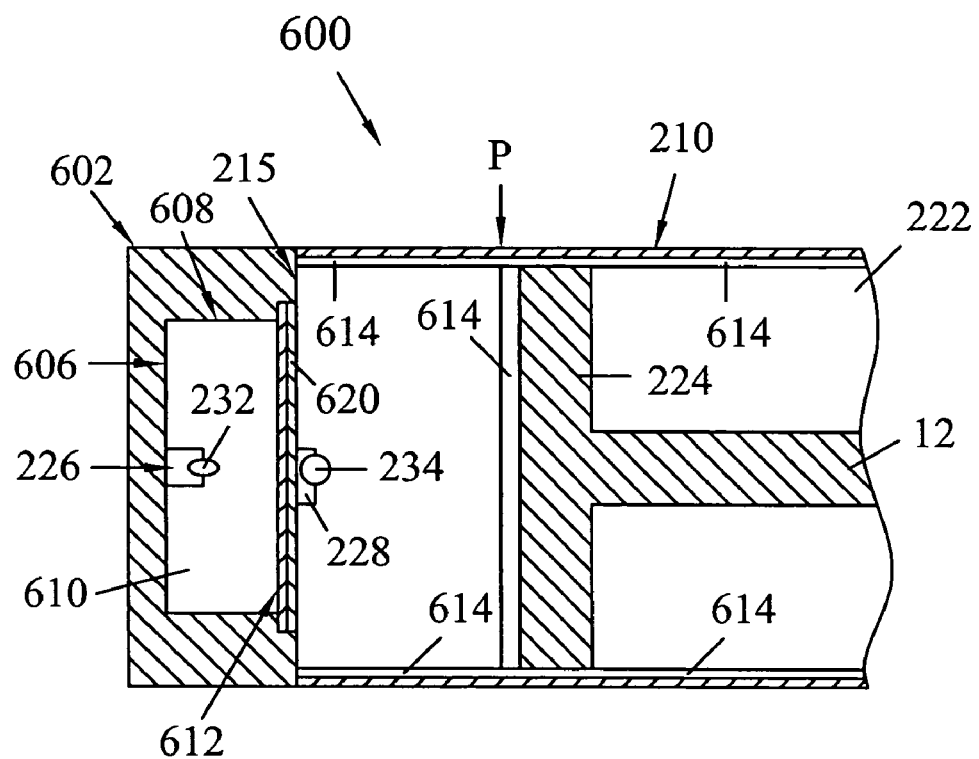
FIG. 6 illustrates a cross-sectional view of a compartment and an end cap having a movable element in an embodiment of the present invention.
Figure 7:
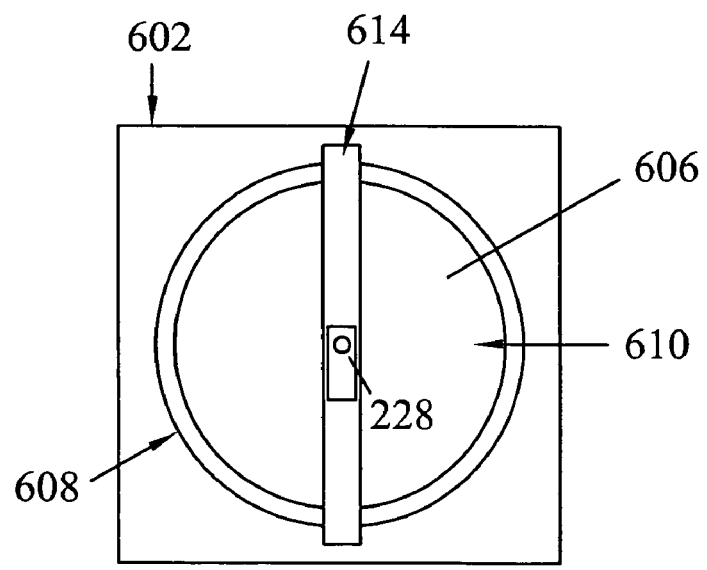
FIG. 7 illustrates a top plan view of an end cap of a compartment in an embodiment of the present invention.
Figure 8:
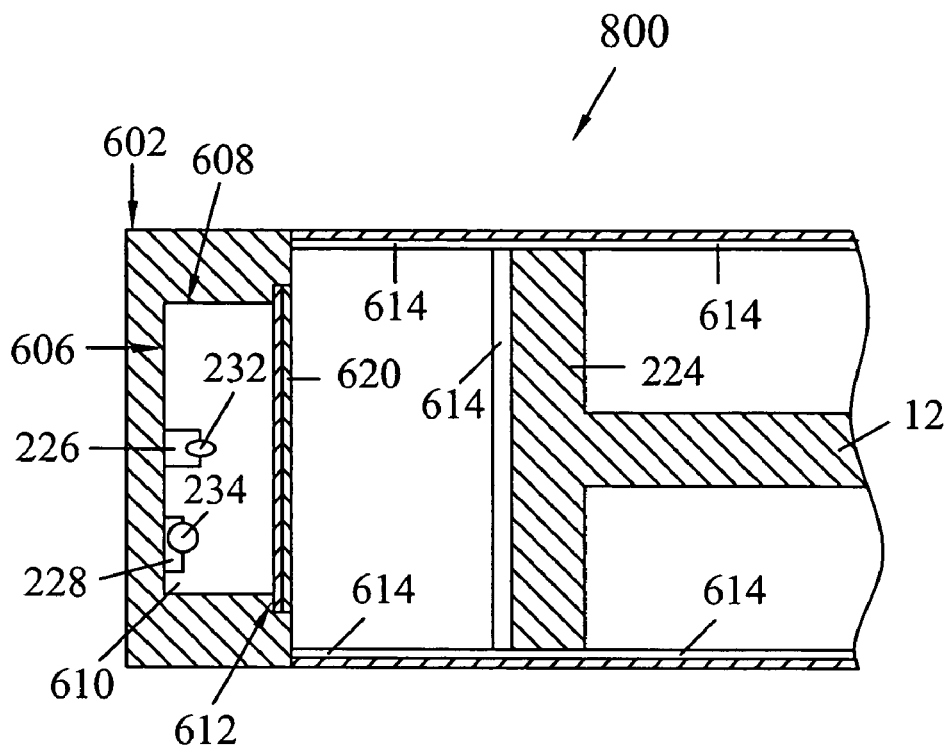
FIG. 8 illustrates a cross-sectional view of a compartment and an end cap having a movable element in another embodiment of the present invention.
Figure 9:
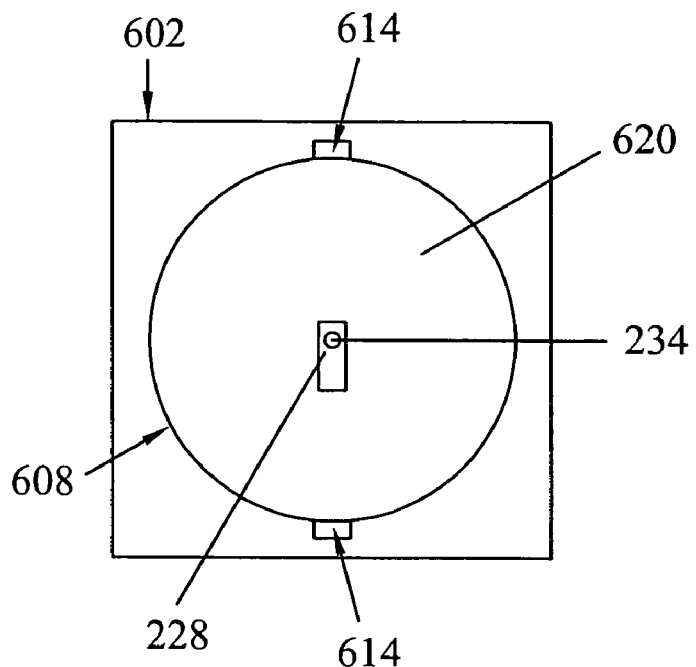
FIG. 9 illustrates a top plan view of an end cap of a compartment having a film in an embodiment of the present invention.

In an embodiment, FIGS. 6 and 7 illustrate a system 600 for detecting the position P of the movable element 224 within the interior 222 of the compartment 210. FIGS. 8 and 9 illustrate a system 800 for detecting the position P of the movable element 224 within the interior 222 of the compartment 210 in an embodiment of the present invention. The movable element 224 of the system 60.0 and/or of the system 800 (collectively known hereinafter as "the systems 600, 800") may be positioned at and/or may be located within the interior 222 of the compartment 210. The movable element 224 may move within the interior 222 of the compartment 210 in a first direction and/or in a second direction via the shaft 12. The movable element 224 may move to, may be positioned at and/or may be located at the position P in the interior 222 of the compartment 210 with respect to the first wall 215 of the compartment 210 as shown in FIGS. 6 and 8.

The first wall 215 of the compartment 210 may have an end cap 602 which may be adjacent to the interior 222 of the compartment 210 as illustrated in FIGS. 6 and 8. Movement of the movable element 224 in the first direction or in the second direction may move the movable element 224 inwardly or outwardly with respect to the first wall 215 of the compartment 10. The end cap 602 may support, may store and/or may contain the light source 226 and a light sensor 228 for emitting light and/or for detecting an intensity of the light, respectively.

The end cap 602 may have a bottom surface 606 and interior walls 608 as illustrated in FIGS. 6-9. The interior walls 608 may be attached to and/or may be connected to the bottom surface 606 and/or may extend outwardly with respect to the bottom surface 606. The bottom surface 606 and the interior walls 608 may form and/or may define an interior 610 of the end cap 602. The end cap 602 may be attached to, may be connected to and/or may be adjacent to the first wall 215 of the compartment 210 as shown in FIGS. 6 and 8. As a result, the interior 610 of the end cap 602 may be accessible from the interior 222 of the compartment 210. Alternatively, the interior 222 of the compartment 210 may be accessible from the interior 610 of the end cap 602. Moreover, the end cap 602 may enclose the interior 222 of the compartment 210 to seal the compartment 210.

The light source 226 may be attached to, may be connected to and/or may be adjacent to the bottom surface 606 of the end cap 602 as shown in FIGS. 6 and 8. The light emitting portion 232 of the light source 226 may be directed towards and/or may be located within the interior 210 of the end cap 602 for projecting, for emitting and/or for transmitting the light into the interior 610 of the end cap 602 and/or into the interior 222 of the compartment 210. The light source 226 may project, may transmit and/or may emit the light into the interior 610 of the compartment 602 and/or into the interior 222 of the compartment 210. As a result, the interior 610 of the end cap 602 and/or the interior 222 of the compartment 210 may be illuminated by light emitted from the light emitting portion 232 of the light source 226 from the bottom surface 606 of the end cap 602.

The end cap 602 may have a platform 612 which may be attached to and/or may be connected to the interior walls 608 of the end cap 602. The platform 612 may extend across the interior 610 of the end cap 602 and/or between the interior walls 608 of the end cap 602. A film 620 may be attached to, may be connected to and/or may be adjacent to the interior walls 608 of the end cap 602 and/or to the platform 612. Further, the film 620 may be connected and/or may be adjacent to the first wall 215 of the compartment 210. In an embodiment, the light sensor 228 may be attached, may be connected and/or may be adjacent to the platform 612 and/or to the film 620 of the end cap 602 as shown in FIGS. 6, 7 and 9. The light sensor 228 may be located between the light source 226 and the interior 222 of the compartment 210 and/or the movable element 224. The film 620 may be located between and/or may be positioned between the light sensor 228 and the platform 612, the interior walls 608 and/or the interior 610 of the end cap 602. The film 620 may separate the interior 222 of the compartment 210 and the interior 610 of the end cap 602. The film 620 may cover and/or may enclose the interior 610 of the end cap 602 to separate the interior 610 of the end cap 602 and the interior 222 of the compartment 210. The film 620 may cover and/or may enclose the interior 222 of the compartment to separate the end cap from the interior 222 of the compartment 210.

The film 620 may absorb, may diffuse and/or may attenuate the light transmitted by the light source 226 through the film 620 from the interior 610 of the end cap 620 into the interior 222 of the compartment 210. The film 620 may absorb, may diffuse and/or may attenuate the light transmitted through the film 620 from the interior 222 of the compartment 210 to the interior 610 of the compartment 602. The film 620 may reduce, may minimize and/or may prevent diffraction of the light transmitted by the light source 226 through the film 620.

The film 620 may be made from a material, such as, for example, a plastic and/or a glass to diffuse and/or to attenuate the light transmitted by the light source 226. In an embodiment, the film may be made from, for example, a mirror acrylic plastic which may have been treated by and/or roughened by sanding, by blasting and/or the like to diffuse and/or to attenuate the light transmitted by the light source 226. In an embodiment, the film 620 may be made from one or more layers to increase or to decrease a speed of the light being transmitted through the film 620 for diffusing and/or for attenuating the light. It should be understood that the film 620 may be made from any material capable of diffusing and/or of attenuating light which is transmitted through the film 620 as known to one of ordinary skill of the art.

In an embodiment, the light sensor 228 may extend from the platform 612 inwardly with respect to the interior 222 of the compartment as shown in FIG. 6. As a result, the detecting portion 234 and/or the light sensor 228 may be located within and/or may be positioned within the interior 222 of the compartment 210. The light sensor 228 may measure, may detect, may determine and/or may identify an intensity of the light emitted within the interior 222 of the compartment from the light source 226 from the interior 610 of the end cap 602. The detecting portion 234 of the light sensor 228 may measure, may detect, may determine and/or may identify the intensity of light within the interior 222 of the compartment 210 which may be diffused by and/or may be attenuated by the film 620.

In an embodiment, the light sensor 228 may be connected to, may be attached to and/or may be adjacent to the bottom surface 606 of the end cap 602 as shown in FIG. 8. As a result, the light sensor 228 may be adjacent to the light source 226 within the interior 610 of the end cap 602. The light emitting portion 232 of the light source 226 may be directed outwardly with respect to the detecting portion 234 of the light sensor 228 within the interior 610 of the end cap 602. As a result, the light emitted from the light source 226 may be prevented from and/or may be blocked from being directed inwardly with respect to the light sensor 228. In an embodiment, the cover 233 m ay be applied to the light emitting portion 232 of the light source 226 to prevent and/or to block the light emitted by the light source 226 from being directed inwardly with respect to the light sensor 228.

The light sensor 228 may measure, may detect, may determine and/or may identify an intensity of the light emitted within the interior 610 of the end cap 602 from the light source 226 as shown in FIG. 8. The light sensor 228 may measure, may detect, may determine and/or may identify the intensity of the light emitted within the interior 610 of the end cap 602 from the interior 222 of the compartment 210 via the film 620. As a result, the light sensor 228 may measure, may detect and/or may determine the intensity of the light emitted within the interior 610 of the end cap 602 which may be diffused by and/or may be attenuated by the film 620.

The light sensor 228 may have the detecting portion 234 for detecting and/or for measuring the intensity of the light which may be transmitted by the light source 226. The detecting portion 234 of the light sensor 228 may be located within, may be directed inward and/or may be positioned within the interior 222 of the compartment as shown in FIG. 6 or within the interior 610 of the end cap 602 as shown in FIG. 8. The light sensor 228 may measure, may determine, may identify and/or may detect the intensity of light emitted within the interior 222 of the compartment 210 and/or within the interior 610 of the end cap 602 via the detecting portion 234 of the light sensor 228. Further, the light sensor 228 may detect, may determine and/or may measure a strength of the light emitted into the interior 222 of the compartment 210 and/or into the interior 610 of the end cap 602 via the detecting portion 234 of the light sensor 228.

In an embodiment, the intensity of the light within the interior 601 of the end cap 602 may correspond to, may be based on and/or may be associated with an intensity of light within the interior 222 of the compartment 210. As a result, the light sensor 228 may measure, may determine, may identify and/or may detect the intensity of the light within the interior 222 of the compartment 210 via the intensity of light within the interior 610 of the end cap 602 as shown in FIG. 8. The intensity of and/or the strength of the light emitted into and/or detected within the interior 222 of the compartment 210 and/or within the interior 610 of the end cap 602 may correspond to the position P of the movable element 224 within the interior 222 of the compartment 210. As a result, the light sensor 228 may determine and/or may detect that the movable element 224 which may be located at the position P within the interior 222 of the compartment 210 via the intensity of the light detected by the light sensor 228. The light sensor 228 may identify the position P of the movable element 224 within the interior 222 of the compartment 210 via the intensity of light emitted within the interior 222 of the compartment 210 and/or within the interior 610 of the end cap 602.

In an embodiment, a driver (not shown in the figures) may be connected to and/or may be in communication with the light source 226 to maintain, to stabilize and/or to control the light emitted from the light source 226 into the interior 222 of the compartment 210 and/or the interior 610 of the end cap 602. As a result, the light emitted by the light source 226 may be, for example, constant, consistent, uniform and/or continuous. The light emitted from the light source 226 may have a color, such as, for example, red, yellow, green, blue or white for illuminating the interior 222 of the compartment 210 and/or the interior 610 of the end cap 602. The present invention should not be deemed as limited to a specific embodiment of the color of the light emitted from the light source 226.

The bottom surface 606 of the end cap 602 may have reflective characteristics for reflecting, for diffusing, and/or for attenuating the light within the interior 610 of the end cap 602 towards the light sensor 228, the interior 610 of the end cap 602, the interior 222 of the compartment 210 and/or the movable element 224. The bottom surface 606 may attenuate the light within the interior 610 of the end cap 602. The light within the interior 610 of the end cap 602 may be transmitted into, may be emitted into and/or may be projected into the interior 222 of the compartment 210 via the film 602 and/or the bottom surface 606 of the end cap 602. As a result, the light within the interior 222 of the compartment 210 may be absorbed, may be diffused and/or may be attenuated by the film 620.

In an embodiment, the bottom surface 606 may be a reflective surface, such as, for example, a mirror and/or the like. The bottom surface 606 may reflect, may diffuse and/or may attenuate and/or may focus the light inwardly with respect to the interior 610 of the end cap 602, the interior 222 of the compartment 210 and/or the light sensor 228. As a result, the light sensor 228 may measure and/or may detect the intensity of the light within the interior 610 of the end cap 602 via the reflective surface 606 of the end cap 602 and/or the intensity of the light within the interior 222 of the compartment 210. In an embodiment, the bottom surface 606 may reduce, may minimize and/or may prevent diffraction of the light within the interior 610 of the end cap 602 and/or within the interior 222 of the compartment 210.

A surface 614 may be formed on the compartment 210 and/or the movable element 224 which may be adjacent to the interior 222 of the compartment 210 for absorbing an amount of the light emitted within the interior 222 of the compartment 210. The surface 614 may be, for example, a coating, a finish, a texture, a light absorbing substance and/or the like. The surface 614 may be uniform, may be symmetric and/or may be continuous with respect to the interior 222 of the compartment 210 for absorbing and/or for reflecting the amount of the light emitted from the light source 226. In an embodiment, the surface 614 of the movable element 224 and/or of the compartment 210 may be made from a first light absorbing material and/or a second light absorbing material, respectively. As a result, the surface 614 may absorb, may diffuse and/or may attenuate the light within the interior 222 of the compartment 210.

In an embodiment, the surface 614 may be, for example, a nitrile compound and/or a ceramic compound which may have light absorbing properties and/or light absorbing characteristics. The surface 614 of the compartment 210 and/or the movable head 224 may have various colors which may affect and/or control the amount of the light which may be absorbed, may be diffused and/or may be attenuated within the interior 222 of the compartment 210. The surface 614 may attenuate, may absorb, may diffuse and/or may scatter the amount of the light emitted within the interior 222 of the compartment 210 for determining that the movable element 224 may be at the position P within the interior 222 of the compartment 210. It should by understood that the surface 614 may be any surface which may have light diffusing properties, light attenuating properties, light absorbing properties and/or light absorbing characteristics as known to one of ordinary skill in the art.

In an embodiment, the surface 614 of the movable element 224 and/or of the compartment 210 may be formed by sanding, by blasting and/or the like. The sanding and/or the blasting, for example, may roughen, may scratch and/or may damage the movable element 224 and/or the compartment 210 to form the surface 614 on the movable element 224 and/or the compartment 210, respectively. As a result, the surface 614 of the movable element 224 and/or the compartment 210 may have, for example, the light absorbing properties, light diffusing properties, light attenuating properties and/or the light absorbing characteristics to absorb the amount of the light emitted within the interior 222 of the compartment 210.

The light within the interior 222 of the compartment 210 which may not have been absorbed by, may have been diffused by and/or may have been attenuated by the surface 614 of the compartment 210 and/or of the movable element 224 may illuminate the interior 610 of the end cap 602 and/or the interior 222 of the compartment 210. As a result, the light within the interior 610 of the end cap may correspond to the light within the interior 222 of the compartment 210 which may not have been absorbed by, may have been diffused by and/or may have been attenuated by the surface 614 of the compartment 210 and/or of the movable element 224. The intensity of the light within the interior 610 of the end cap 602 may correspond to and/or may be based on the intensity of the light emitted within the interior 222 of the compartment 210 which may not have been absorbed by, may have been diffused by and/or may have been attenuated by the surface 614 of the compartment 210 and/or of the movable element 224.

The intensity of the light within the interior 610 of the end cap 602 may correspond to and/or may be based on the position P of the movable element 224 within the interior 222 of the compartment 210. As a result, the light sensor 228 may determine that the movable element 224 may be at the position P based on the intensity of the light within the interior 222 of the compartment 210 and/or within the interior 610 of the end cap 602.

The bottom surface 606 of the end cap 602 may reflect, may diffuse and/or may scatter the light within the interior 610 of the end cap 602 which may be received from, may be transmitted from and/or may be projected from the interior 222 of the compartment 210 inwardly with respect to the light sensor 228. The light sensor 228 may detect and/or may measure the intensity of the emitted light within the interior 610 of the end cap 602 via the bottom surface 606 of the end cap 602. As a result, the light sensor 228 may determine, may identify and/or may locate the position P of the movable element 224 based on the intensity of the light within the interior 610 of the end cap 602.

The various embodiments of the present invention may be operated by any power supply known by those skilled in the art. In addition, the various embodiments may be operated in and/or may be operated from remote locations through the use of an electric generator, a pressurized air line, or the like.

The systems 600, 800 may detect, may determine and/or may identify that the movable element 224 may be located at the position P within the interior 222 of the compartment 210 via the light source 226 and/or the light sensor 228 as shown in FIGS. 6 and 8, respectively. The light sensor 228 may be connected to the platform 614 and/or the film 620 to detect and/or to measure the intensity of the light within the interior 222 of the compartment 210. In an embodiment, the light sensor 228 may be connected to the bottom surface 606 of the end cap 602 to detect and/or to measure the intensity of the light within the interior 610 of the end cap 602. The film 620, the bottom surface 606 of the end cap 602 and/or the surface 614 of the movable element 224 and/or the compartment 210 may absorb, may diffuse and/or may attenuate light within the interior 222 of the compartment 210 and/or within the interior 610 of the end cap 602. The intensity of the light which may be detectable by the light sensor 228 may correspond to and/or may be based on the position P of the movable element 224 within the interior 222 of the compartment 210. The position P of the movable element 224 within the interior 222 of the compartment 210 may be detected by and/or may be determined by the light sensor 228 via the intensity of the light detectable by the light sensor 228. The film 620, the platform 614, the bottom surface 606 of the end cap 602 and/or the surface 614 of the movable element 224 and/or of the compartment 210 may reduce, may minimize and/or may prevent diffraction of the light within the interior 222 of the compartment 210 and/or within the interior 610 of the end cap 602.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for detecting a position of a movable element wherein the movable element has a surface, the system comprising:
    a compartment having a body defining an interior wherein the body has an interior surface and a length defined between a first end and a second end of the compartment wherein the movable element moves within the interior of the compartment between the first end and the second end of the compartment;
    a cap having bottom surface and walls defining an interior of the cap wherein the walls are connected to the bottom surface wherein the cap is connected to the first end of the compartment wherein the interior of the compartment is adjacent to the interior of the cap;
    a film connected to the walls of the cap wherein the film encloses the interior of the cap wherein the film diffuses light emitted into the interior of the compartment; and
    a sensor connected to the cap wherein the sensor is adjacent to the first end of the compartment wherein the sensor detects an intensity of the light within the interior of the compartment which is attenuated by the interior surface of the compartment or by the surface of the movable element wherein the intensity of the light within the interior of the compartment corresponds to the position of the movable element within the interior of the compartment.

2. The system of claim 1 wherein the film is made from glass or plastic.

3. The system of claim 1 further comprising:
    a light source connected to the cap wherein the light source projects the light into the interior of the compartment.

4. The system of claim 1 further comprising:
a platform attached to the walls of the cap wherein the platform connects the sensor to the cap.

5. The system of claim 1 further comprising:
a coating on the interior surface of the compartment wherein the coating attenuates the light emitted into the interior of the compartment.

6. The system of claim 1 further comprising:
a microprocessor connected to the sensor wherein the microprocessor is in communication with the sensor.

7. The system of claim 1 further comprising:
a coating on the surface of the movable element wherein the coating attenuates the light emitted within the interior of the compartment.

8. The system of claim 1 wherein the sensor is attached to the bottom surface of the cap wherein the sensor detects an intensity of light within the interior of the cap.

9. A system for detecting a position of a movable element, the system comprising:
a compartment having a body defining an interior wherein the body has an interior surface and a length defined between a first end and a second end of the compartment;
a cap having a bottom surface and walls defining an interior of the cap wherein the walls are connected to the bottom surface wherein the cap is connected to the first end of the compartment;
a light source connected to the cap wherein the light source transmits light into the interior of the cap and the interior of the compartment wherein the interior surface of the compartment attenuates the light within the interior of the compartment;
a film connected to the walls of the cap wherein the film separates the interior of the cap and the interior of the compartment wherein the film diffuses light transmitted into the interior of the cap and the interior of the compartment; and
a sensor connected to the walls of the cap wherein the sensor detects an intensity of the light within the interior of the cap or the interior of the compartment wherein the intensity of the light corresponds to the light attenuated by the interior surface of the compartment wherein the light attenuated by the interior surface of the compartment corresponds to the position of the movable element.

10. The system of claim 9 wherein the film is made from glass or plastic.

11. The system of claim 9 further comprising:
a platform attached to the walls of the cap wherein the platform is located between the interior of the cap and the film.

12. The system of claim 9 further comprising:
a coating on the movable element wherein the coating attenuates the light within the interior of the compartment.

13. The system of claim 9 wherein the sensor is attached to the film wherein the sensor is located within the interior of the compartment.

14. The system of claim 9 further comprising:
a coating on the interior surface of the compartment wherein the coating attenuates the light within the interior of the compartment.

15. A method for detecting a position of a movable element, the method comprising the steps of:
providing a compartment having a body defining an interior wherein the body has an interior surface and a length defined between a first end and a second end;
positioning a movable element within the interior of the compartment wherein the movable element moves within the interior of the compartment between the first end and the second end of the compartment;
connecting a film to the first end of the compartment wherein the film encloses the interior of the compartment wherein the film diffuses light emitted from the first end of the compartment into the interior of the compartment; and
detecting an intensity of the light within the interior of the compartment wherein the intensity of the light corresponds to an amount of the light attenuated by the interior surface of the compartment and the movable element wherein the amount of light attenuated corresponds to the position of the movable element within the interior of the compartment.

16. The method of claim 15 further comprising the step of:
connecting a cap to the first end of the compartment wherein the cap has an interior which is separated from the interior of the compartment via the film.

17. The method of claim 15 further comprising the step of:
moving the movable element from the first position to a second position with respect to the interior of the compartment.

18. The method of claim 15 further comprising the step of:
connecting a light source to the first end of the compartment wherein the light source emits the light into the interior of the compartment via the film.

19. The method of claim 15 further comprising the step of:
attaching a platform to the first end of the compartment wherein the film is located between the interior of the compartment and the platform.

20. The method of claim 15 further comprising the step of:
forming a surface on the movable element wherein the surface attenuates the light within the interior of the compartment.

* * * * *